United States Patent [19]

Cassarly et al.

[11] Patent Number: 5,469,337
[45] Date of Patent: Nov. 21, 1995

[54] MULTIPLE PORT HIGH BRIGHTNESS CENTRALIZED LIGHTING SYSTEM

[75] Inventors: William J. Cassarly, Richmond Heights; John M. Davenport, Lyndhurst; Richard L. Hansler, Pepper Pike, all of Ohio

[73] Assignee: General Electric Company, Schenectady, N.Y.

[21] Appl. No.: 339,367

[22] Filed: Nov. 14, 1994

[51] Int. Cl.$^6$ .................................................. F21V 7/04
[52] U.S. Cl. ............................................................ 362/32
[58] Field of Search .................................................. 362/32

[56] References Cited

U.S. PATENT DOCUMENTS

| | | | |
|---|---|---|---|
| 4,459,643 | 7/1984 | Mori | 362/32 |
| 4,883,333 | 11/1989 | Yanez | 362/32 |
| 5,222,793 | 6/1993 | Davenport et al. | 362/32 |
| 5,278,731 | 1/1994 | Davenport et al. | 362/32 |

Primary Examiner—Carroll B. Dority

[57] ABSTRACT

A centralized lighting system having a plurality of output ports includes a high brightness light source disposed at the optical focal point of a parabolic reflector. The light source and reflector configuration deliver light output in an essentially parallel manner to a plurality of lens members effective for focussing the light output into a plurality of spatially separate light spots. The spatially separate light spots are input to optical fibers without experiencing packing fraction losses. The plurality of lens members are disposed equidistantly along radii formed relative to the reflector but at a spaced apart relation to the reflector. In this manner, the lens members provide the spatially separate light spots which are essentially equal in terms of color and intensity to one another.

17 Claims, 5 Drawing Sheets

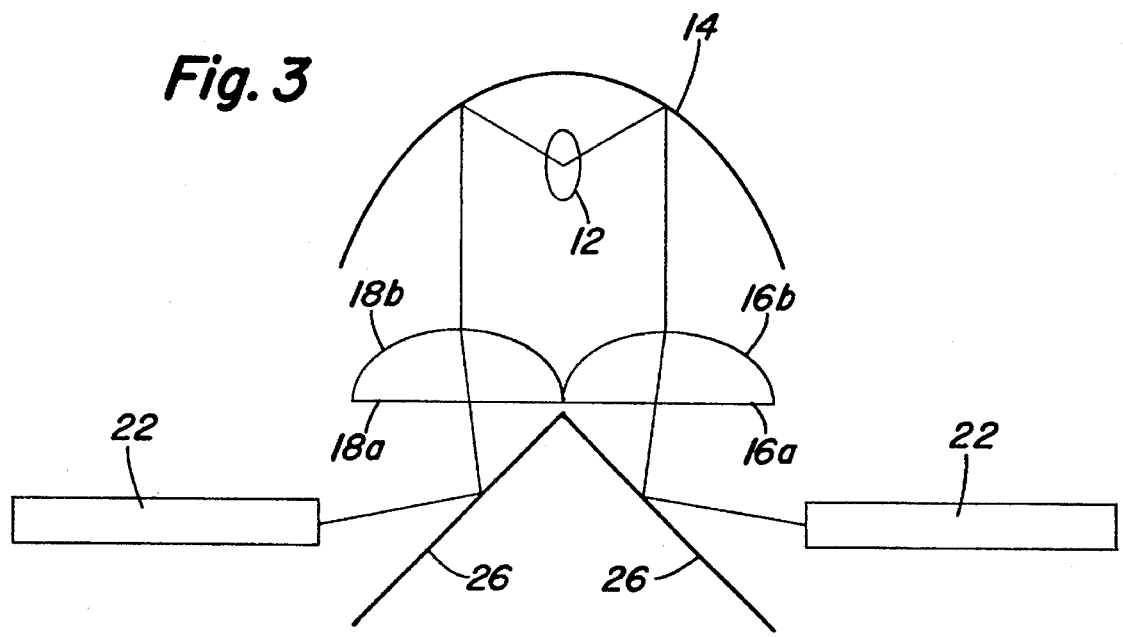
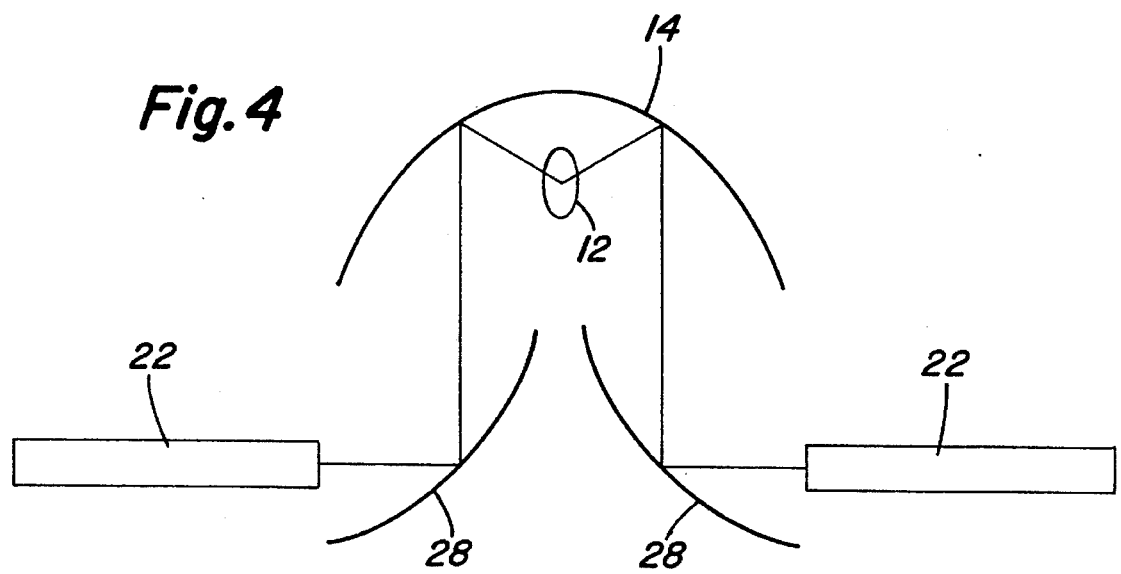

MULTIPLE PORT HIGH BRIGHTNESS CENTRALIZED LIGHTING SYSTEM

FIELD OF THE INVENTION

This invention relates to a high brightness centralized lighting system having the capability of producing a light output at a number of output ports. More particularly, this invention relates to such a lighting system that provides the light output to the multiple output ports in a balanced manner whereby the light output is essentially identical at all such ports and such light output allows for improved packing fraction characteristics for coupling to optical fibers.

BACKGROUND OF THE INVENTION

A high brightness centralized lighting system has been proposed for various lighting applications where it is desired to have a central light source and a plurality of remote locations which are illuminated from the central light source over optical fibers or light pipes. An example of such a centralized lighting system can be found in U.S. Pat. No. 4,958,263 issued to Davenport et al on Sep. 18, 1990 and assigned to the same assignee as the present invention. In this patent, a light source is provided having a central ellipsoidally-shaped arc tube and a number of extending tube shaped extensions formed thereon. Each of the extending tube portions is coupled over optical fibers to various locations around a vehicle for providing lighting needed for forward illumination, tail lighting and overhead lighting for instance. It has been found with such an arrangement that there is little uniformity of the light output for the various tubular extensions. Additionally, it has been found that in order to provide the necessary amount of illumination at the desired location, large diameter optical fibers on the order of approximately 10 mm or greater are required. For such a large optical fiber, in addition to being more expensive, it is difficult to maneuver and turn the optical fiber for placement within the body of the vehicle. Another example of the use of a centralized lighting source and optical fibers for providing the forward illumination in a vehicle, can be found in U.S. Pat. No. 5,278,731 issued to Davenport et al. on Jan. 11, 1994 and assigned to the same assignee as the present invention. In this patent, a single optical fiber is introduced to a substantially conventional automotive reflector assembly except that a V-shaped mirror provides for distribution of the light output from the end of the fiber to the reflector surface for transmission through a lens member. In the configuration of this patent, assuming that the optical fiber is 10 mm in diameter, the beam produced would have approximately a 5 degree vertical spread. The 5 degree vertical spread exceeds the 4 degree right, 4 degree down SAE test point and further exhibits excessive foreground illumination. It would therefore be desirable to provide a centralized lighting system for automotive applications that would allow for the use of smaller diameter optical fibers and would achieve the appropriate beam pattern in terms of spread characteristics.

A further problem to be solved in providing a centralized lighting system for use in automotive applications involves the ability to provide a light output that is uniform in appearance from both the left and right side of the vehicle. An example of a centralized lighting system that provides a substantially uniform appearing light output at both sides of a vehicle can be found in U.S. Pat. No. 5,222,793 issued to Davenport et al on Jun. 29, 1993 and assigned to the same assignee as the present invention. In this patent, in order to achieve a multiple beam output from a single light source, a split reflector configuration is utilized to provide two light outputs and optical fibers are disposed in contacting side by side relation for a specific length and then split for distribution to the two sides of the vehicle. Although effective in achieving a multiple beam output from a single light source, the system of patent No. 5,222,793 requires precision machining operations to manufacture the split reflector arrangement and as well, because the optical fibers are in a contacting relation to one another, insulating problems between the contacting optical fibers can sometimes be experienced.

Still a further problem to be dealt with in providing multiple light outputs from a single centralized light source is that of achieving an optimum packing fraction between the multiple optical fibers that are being utilized. In other words, by directing light from a single light source into a plurality of input surfaces of optical fibers bundled together, there will be spaces formed between the optical fibers that will result in light which is presented thereto being lost. The amount of surface area associated with the optical fiber inputs divided by the area of the light output presented to the optical fibers is defined as the packing fraction and it is desirable to have this value maximized. In fact, it would be further desirable to provide a light output from the light source that was divided into individual light spots prior to delivery to the input surface of the optical fiber and to provide such individual light spots in a cost effective manner without requiring the use of complicated reflector devices that are manufactured only to tight tolerances.

SUMMARY OF THE INVENTION

The present invention provides a centralized lighting system having multiple port outputs wherein each of the light outputs at each of the ports is substantially equivalent to all other light outputs at the other ports. Additionally, the present invention provides such a multiple port light output arrangement the provides the multiple spot light output without the need for a costly reflector arrangement and which further provides such multiple spot light output in a manner so as to substantially avoid problems associated with the packing fraction of the plurality of optical fiber input surfaces.

In accordance with the principles of the present invention, there is provided a centralized lighting system having multiple outputs for distributing light to a plurality of remote locations. The lighting system includes a high brightness light source which is disposed at the optical focal point of a reflector member configured in the form of a parabaloid. The light source and parabolic reflector configuration is effective so as to deliver light output therefrom in an essentially parallel beam pattern configuration. A plurality of lens members each having a first surface receptive of the light output from the light source and reflector configuration, also have respective second, curved surfaces associated therewith. The second surfaces of the lens members are effective so as to focus the light output from the light source and reflector member into respective focussed light outputs. A plurality of optical fibers receive the focussed light outputs and are effective for delivering such light output to the remote locations. The plurality of lens members are disposed equidistantly along radii formed relative to the reflector member but at a spaced apart relation to the reflector member. In this manner, the lens members are effective for providing a plurality of light output spots to the input faces of the optical fibers, the plurality of light output spots being substantially uniform in terms of color and intensity to one another.

BRIEF DESCRIPTION OF THE DRAWINGS

In the following detailed description, reference will be made to the attached drawings in which:

FIG. 3 is an elevational view of a third centralized lighting system constructed in accordance with another alternate embodiment of the invention.

FIG. 4 is an elevational view of a fourth centralized lighting system constructed in accordance with still another alternate embodiment of the invention.

DETAILED DESCRIPTION OF THE INVENTION

Figure 1:
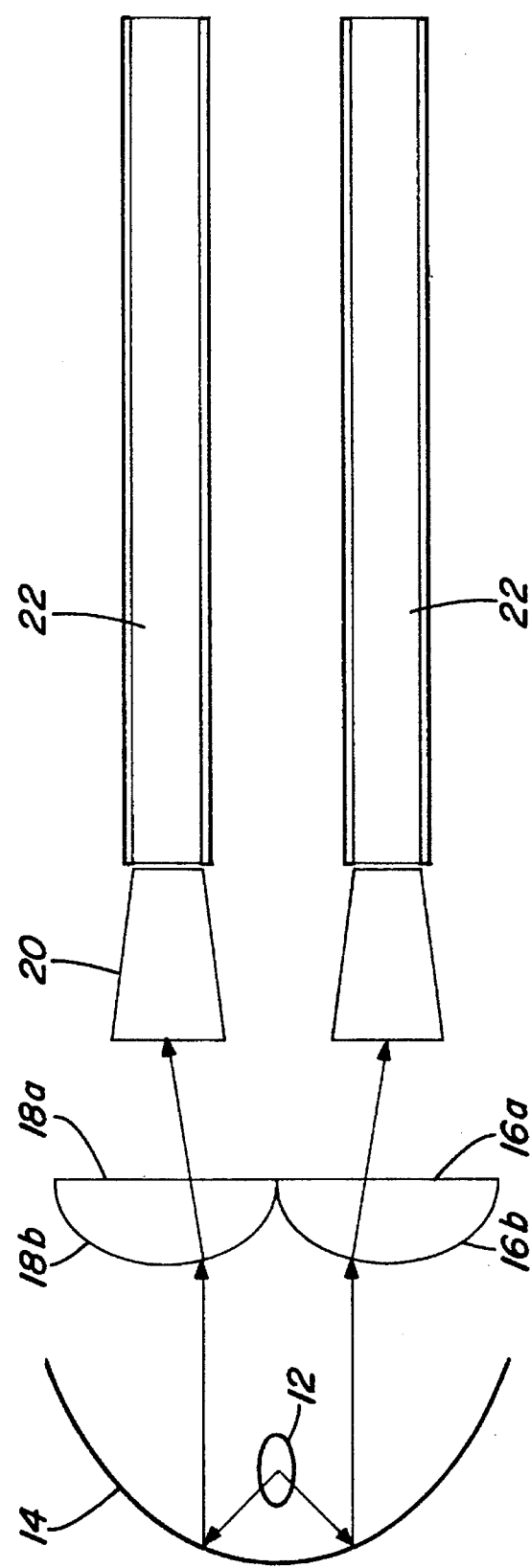
FIG. 1 is an elevational view of a centralized lighting system constructed in accordance with the present invention.

As seen in FIG. 1, a centralized lighting system 10 includes a high brightness light source 12 which in the preferred embodiment can be provided by means of a xenon-metal halide lamp as described in U.S. Pat. No. 5,239,230 issued to Mathews et al on Aug. 24, 1993 and assigned to the same assignee as the present invention. Of course, it can be appreciated that other light sources can be utilized as well with the present invention, such as for instance a tungsten halogen incandescent light source or, another metal halide or other discharge light source.

Figure 5:
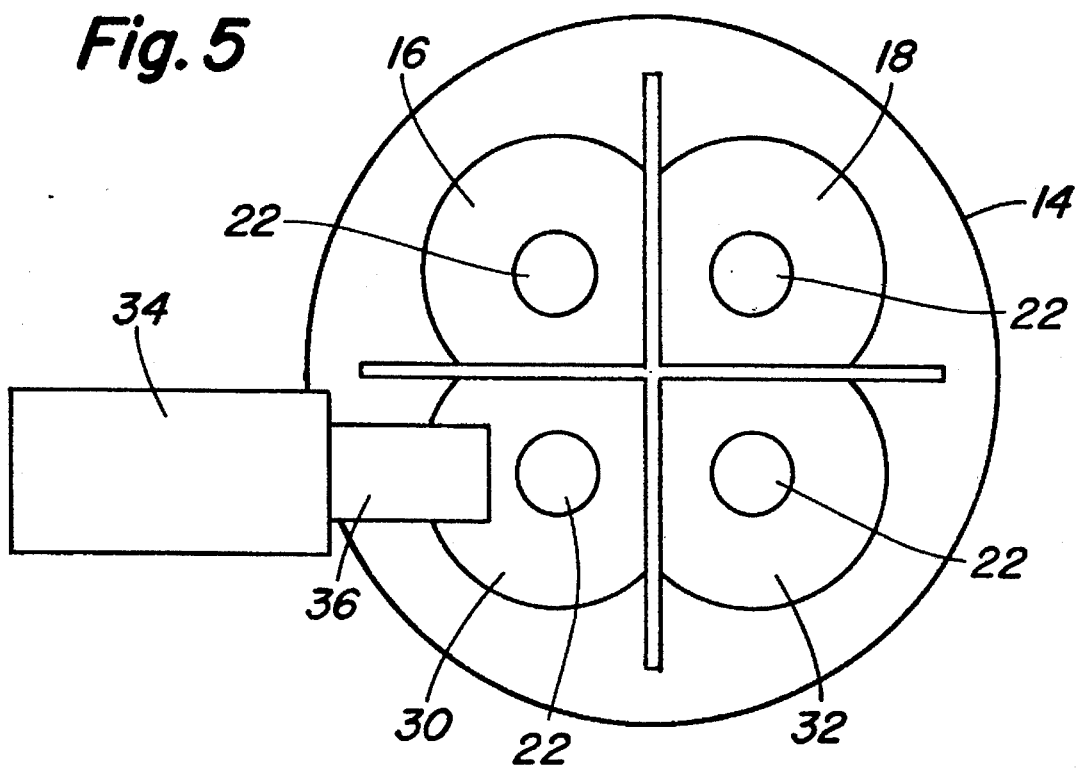
FIG. 5 is an elevational view of the output portion of the reflector/lens configuration constructed in accordance with an application of the present invention to an automotive headlamp.
Figure 6:
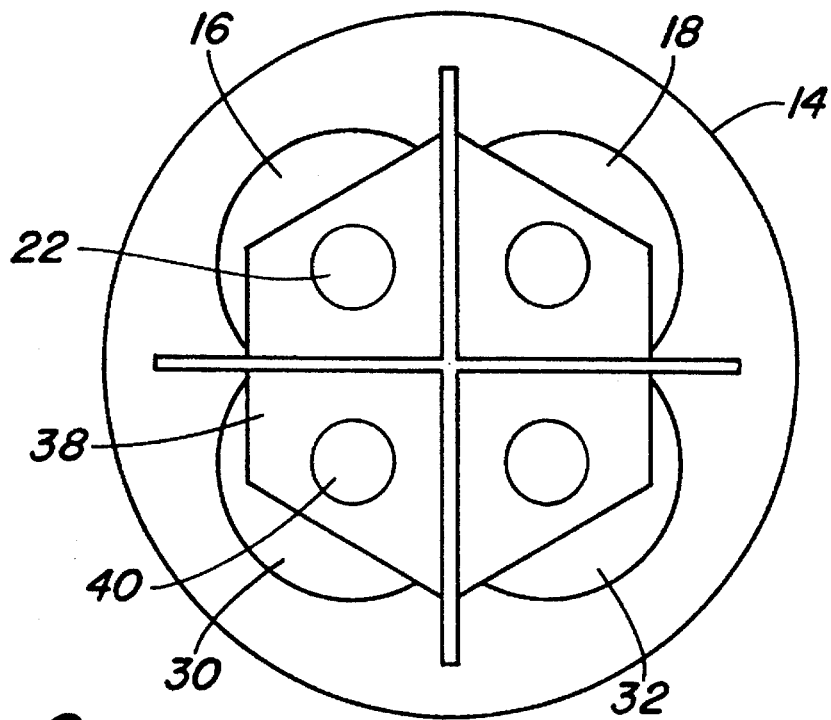
FIG. 6 is an elevational view of the output portion of the reflector/lens configuration constructed in accordance with a second application of the present invention to a light color filter apparatus.

Light source 12 is disposed at the optical focal point of a reflector member 14 configured in the form of a parabaloid. Light output from the light source 12, reflector member 14 configuration is directed to one surface of a plurality of lens members 16, 18. Although only 2 lens members 16, 18 are shown, it is contemplated that any plurality of lens members would be equally as effective in achieving the results of the present invention. In fact, as shown in FIGS. 5 and 6 to be described hereinafter in further detail, there would be an additional pair of lens members and optical fibers behind those shown here. The lens members 16, 18 are preferably aspherical lenses so as to achieve a high performance thereby. As such, lens members 16, 18 have respective first surfaces 16a, 18a which are planar, as well as respective second surfaces 16b, 18b which are curvilinear. As shown in FIG. 1, light output from the light source 12, reflector member 14 configuration is first received at the curved surfaces 16b, 18b and focussed through the lens members 16, 18 so as to be output from the respective first surfaces 16a, 18a as focussed, spatially separate light spots.

The light output from the lens members 16, 18 is then received at the input surface of respective compound parabolic collectors (CPCs) which are effective for better collecting light by capturing light which would normally focus outside of the input surface area of an optical fiber or, by performing angle-to-area conversion that enables smaller optical fibers with high NA ratings to be used. It should be noted that the NA rating signifies how high of an input angle light presented at the input surface area of the optical fiber can be transported through that optical fiber. The higher the NA rating, the higher the input angle light can have and still be transported through the optical fiber. As further seen in FIG. 1, a pair of optical fibers 22 are disposed in a parallel, non-contacting relation to one another. The optical fibers 22 receive the light input through the CPCs 20 and direct the light to the desired remote locations (not shown). By focussing the light output from the lens members 16, 18 into spatially separate light spots, it should be appreciated that packing fraction problems typically encountered with coupling light from a single centralized source to a plurality of optical fibers, can be avoided. Typically, when a single light source is used in conjunction with an ellipsoidally shaped reflector, the light output is provided at a second optical focal point to the optical fibers which are bundled in the area of the second optical focal point so as to receive the light. When non-compressible optical fibers are used, spaces will exist between the optical fibers and light that strikes these spaces becomes wasted. Additionally, by bundling the optical fibers together in such a tight area, the fibers come in contact with one another and as such, can result in insulating problems therebetween. The present invention, by providing spatially separated light spots that can be configured to substantially conform to the input surface shape of the optical fibers, light loss associated with groups of optical fibers bundled together, can be avoided. As well, by providing spatially separated light spots, the optical fibers can be disposed in a non-contacting relation to one another thereby eliminating insulation problems sometimes associated with optical fibers disposed in a contacting relation to one another.

Figure 2:
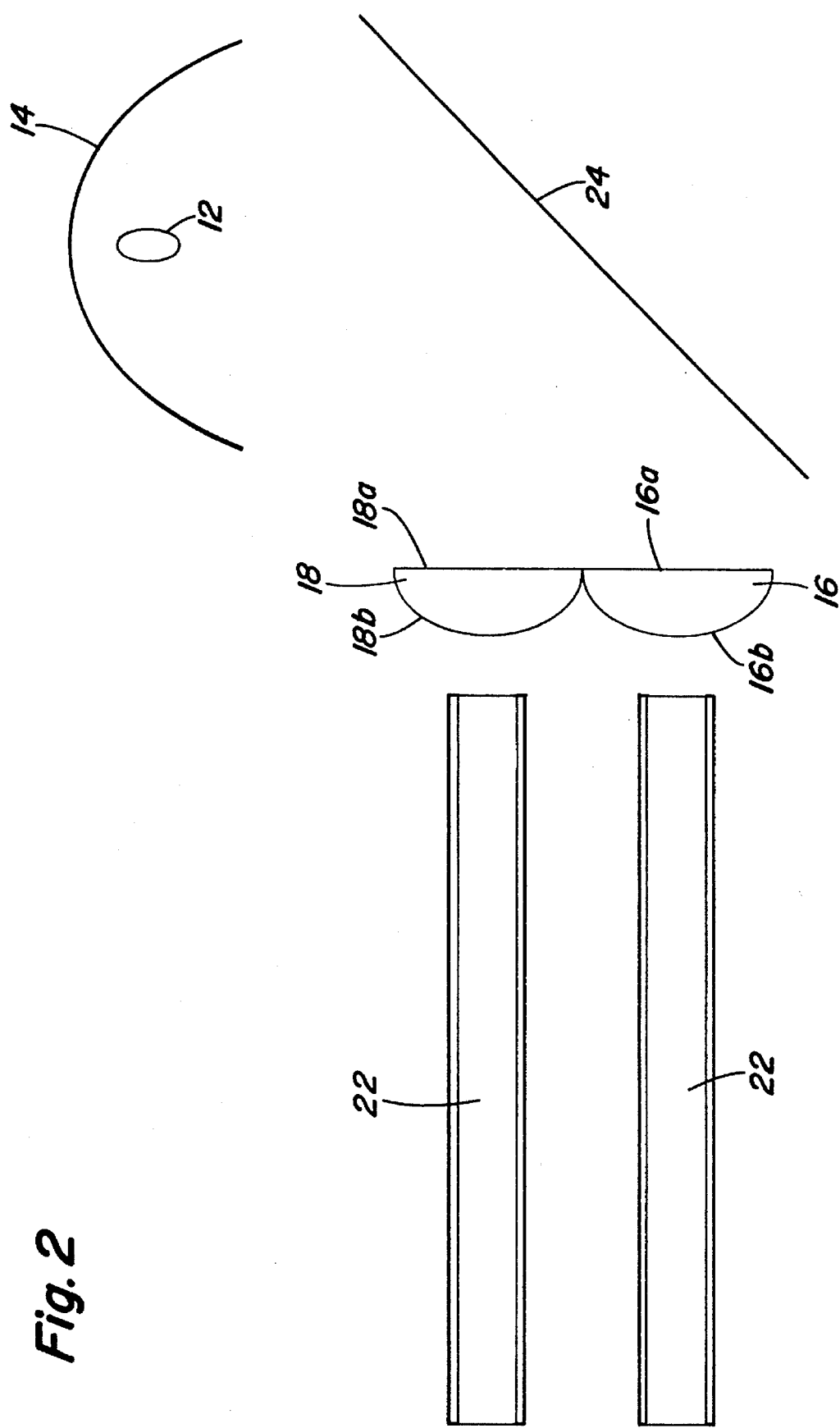
FIG. 2 is an elevational view of a second centralized lighting system constructed in accordance with an alternate embodiment of the present invention.

As seen in FIG. 2, an alternate lighting system is provided which utilizes the same light source 12, reflector member 14 configuration as shown in FIG. 1. However, the lighting system of FIG. 2 includes a turning mirror 24 which is effective for directing the light output from the light source 12, reflector member 14 configuration at an angle such as for instance, the 90 degree angle shown in FIG. 2. The light reflecting off of the turning mirror 24 is then presented to the first surfaces 16a, 18a of the lens members 16, 18. The lens members 16, 18 are effective for focussing the light into spatially separate light spots similar to those described in relation to FIG. 1. Such spatially separate light spots are output from the respective curved sides 16b, 18b of the lens members and are presented to the input surfaces of optical fibers 22 which are shown in this arrangement without the CPCs of FIG. 1. Further advantageous to the lighting system shown in FIG. 2 is the fact that the turning mirror 24 can be used for the purpose of providing IR rejection, that is, turning mirror 24 can be constructed to pass IR radiation rather than reflect such radiation toward the lens members 16, 18 and the optical fibers 22. Additionally, it would be possible to package the lighting system of FIG. 2 in a more compact housing because of the use of the turning mirror 24.

For the lighting systems shown in FIGS. 1 and 2, the optical fibers are arranged in a parallel manner with their respective output ends facing in the same direction. It would be desirable to provide a lighting system that achieved the same benefits as those of FIGS. 1 and 2 yet could do so by providing light outputs that would extend in directions different from one another. The lighting systems of FIGS. 3 and 4 provide just such arrangements. In the lighting system of FIG. 3, a V-shaped mirror 26 is disposed between the output of the lens members 16, 18 and the input surface of the optical fibers 22. In this manner, the light output from the respective output ends of the optical fibers 22 can be transmitted in directions that are distinct, such as the opposite facing directions shown in FIG. 3. It can be appreciated that by changing the angle of the respective mirror components of the V-shaped mirror 26, the angle that the output surfaces of the optical fibers can be changed relative to one another. An even simpler approach to achieving light transmission in opposite directions is shown in FIG. 4 where the lens members 16, 18 and the V-shaped mirror 26 are replaced in favor of off-axis parabolas 28.

As seen in FIG. 5, the lighting system of figures 1 and 2 can include an array of lens members 16, 18, 30 and 32 that is effective for providing 4 spatially separate light spots which can be directed to 4 distinct optical fibers 22. As seen in this figure, the lens members 16, 18, 30 and 32 are arranged in a manner to be in contacting relation to one another with at least one side of each lens member contacting a corresponding at least one side of any adjacent lens member. It will be further noted that the lens members 16, 18, 30 and 32 are disposed equidistantly along radii extending from the center of the reflector member 14. Of course, as seen in FIGS. 1 and 2, the lens members 16, 18, 30 and 32 do not actually reside on the reflector member 14 but are spaced apart from the reflector member 14. By occupying respective spaces which are equidistant from the center point of the reflector member 14, a uniformity in the color and intensity of the light spots is achieved. If the lens members were disposed at different positions along the radii extending out from the center of the reflector member 14, there would be a variation in the color and intensity of the light which is directed to the input surface of the lens member. It should also be noted that although only 4 lens members are shown in this figure, it would be possible to use any number of lens members provided they were disposed equidistantly as described above.

In applying the lighting system of FIG. 5, it is possible to control the output of any number of the lens members. As shown in the figure, only lens member 30 is controlled by means of a control unit 34 having a control arm 36 associated therewith. Actuation of the control unit 34 results in movement of the control arm 36 either into a blocking position that would prevent light from being transmitted from the lens member 30 to its associated optical fiber 22 or into the non-blocking position as shown in the figure. An example of where this type of control arrangement would be useful would be for an automotive forward lighting application where the three non-controlled light outputs associated with lens members 16, 18, and 32 would provide the equivalent of a low beam headlamp and the addition of the light output from lens member 30 would result in providing the high beam illumination. The actuation of control unit 34 for such an automotive lighting application can be accomplished using a conventional on-off switch arrangement as is well known in the art.

Another example of an application of a multiple port lighting system is shown in FIG. 6 wherein the 4 output ports associated with lens members 16, 18, 30 and 32 have disposed thereover, a color wheel device 38 which includes 4 separate, distinct color filters each of which, when positioned over any of the lens member outputs, results in changing the color of the light presented to the associated optical fiber to that color. The movement of the color wheel 38 can be controlled so that the colors at the various optical fiber output faces can be varied. Such a color varying light output would have application in stage and studio lighting as well as merchandise display lighting.

Figure 7:
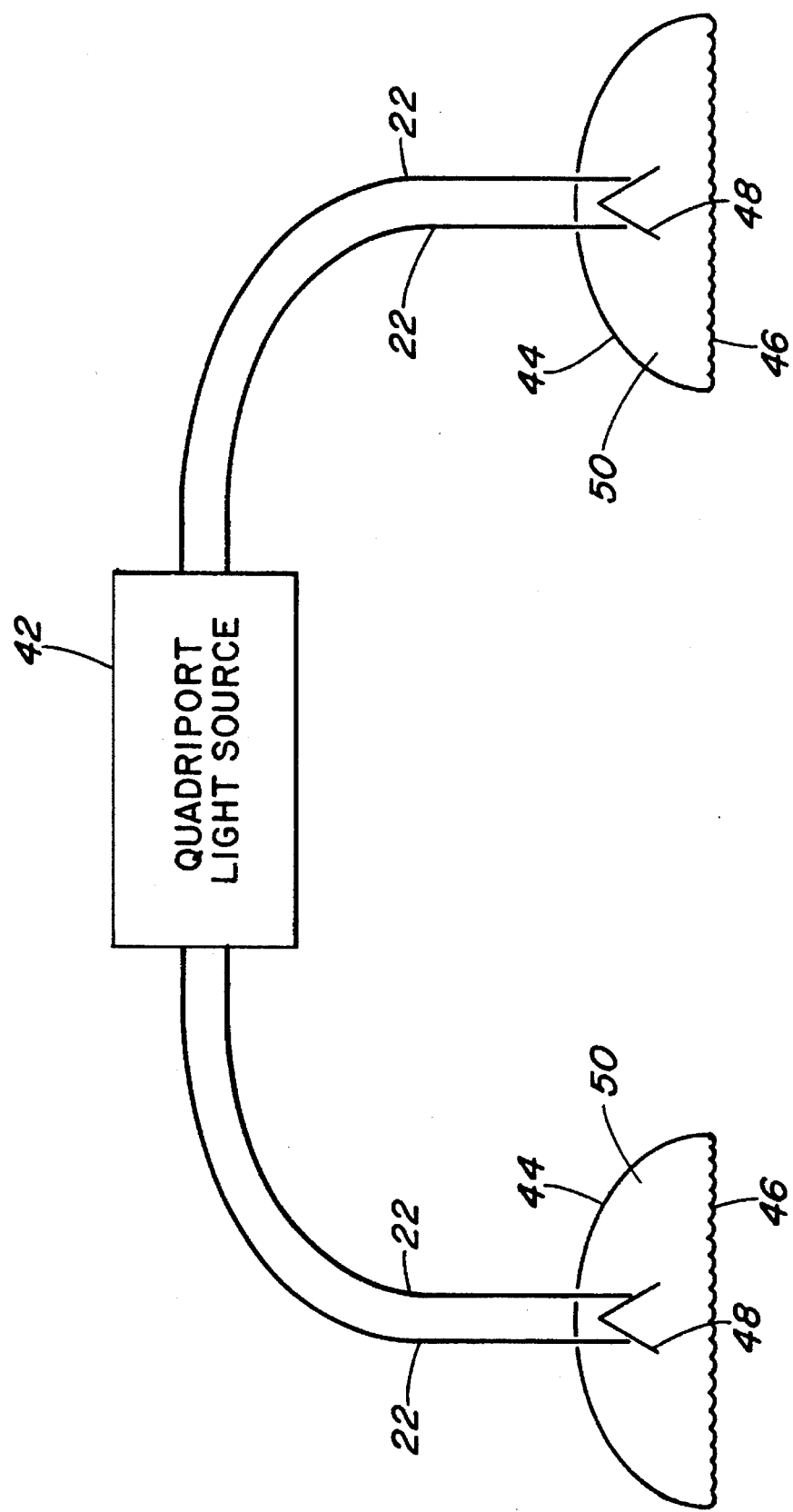
FIG. 7 is an elevational view of a centralized lighting system constructed in accordance with the present invention and applied to an automotive lighting application.

FIG. 7 shows an automotive application of a multiport lighting system 42 which could include the light source 12, reflector member 14 and lens members 16, 18, 30 and 32 as well as possibly the CPCs 20. The light output of the quadriport light source 42 is transmitted over four optical fibers 22 to right and left headlamp assemblies 44. The output of the optical fibers 22 is directed to a curved reflector 50 by way of a V-shaped mirror 48. From the curved reflector 50, the light is directed forward through a lens cover 46 to be distributed on a roadway surface in the desired beam pattern. By way of example, optical fibers 22 can be on the order of 7 mm in diameter each so that with two fibers to each headlamp assembly 44, the total input area of the input surface and hence the lumen density, would be the same as that of a 10 mm optical fiber. By utilizing the two smaller diameter fibers, the lighting system of FIG. 7 can provide a beam pattern that has a vertical spread reduced to 3.5 degrees which is within the limits of the SAE test point requirements of 4 degrees down and 4 degrees down.

Although the hereinabove described embodiments constitute the preferred embodiments of the invention, it should be understood that modifications can be made thereto without departing from the scope of the invention as set forth in the appended claims. For example, it would be possible to combine the lens members 16, 18 of FIG. 1 with the CPC members 20 into a single element thereby eliminating two reflective surfaces 16a, 18a and the CPC input surface. Elimination of these two reflective surfaces would result in an 8% increase in light being transported through the optical fibers 22. An appropriate dielectric material could be interposed between the lens and CPC elements of the combined lens/CPC configuration.

We claim:

1. A centralized lighting system having multiple outputs for distributing light output to a plurality of remote locations, said lighting system comprising:

a high brightness light source;

a reflector member configured in the form of a paraboloid and having associated therewith, an optical focal point, said light source being disposed at said optical focal point so that light is directed from said reflector member in an essentially parallel manner;

a plurality of lens members located in a common place each having a first surface receptive of light from said light source and said reflector member, said plurality of lens members further each having a second surface, means including said plurality of lens members being effective so as to focus said light from said light source and said reflector member into focussed light outputs;

a plurality of optical fibers each receptive of the of said focussed light outputs and effective so as to deliver light to one of said remote locations; and, wherein said plurality of lens members are disposed at a spaced apart relation to said reflector member, said lens members, so arranged, being effective so as to provide a plurality of spatially separated light output spots to said plurality of optical fibers, said plurality of spatially separate light spots being substantially equal in terms of color and intensity.

2. The centralized lighting system as set forth in claim 1 wherein said plurality of lens members are disposed relative to one another so that at least a portion of each lens member contacts at least another portion of at least one other lens member.

3. The centralized lighting system as set forth in claim 2 wherein said portions of said lens members that contact one another are tapered so as to securely fit adjacent one another thereby substantially eliminating spaces formed therebetween.

4. The centralized lighting system as set forth in claim 1 wherein said means to focus said light includes a turning mirror disposed between said reflector member and said plurality of lens members, said turning mirror being effective so as to redirect light presented thereto.

5. The centralized lighting system as set forth in claim 1 wherein said plurality of optical fibers are disposed in non-contacting relation to one another and said spatially separated light output spots are associated with to said plurality of optical fibers on a one to one basis thereby avoiding packing fraction losses by said optical fibers.

6. The centralized lighting system as set forth in claim 1 further comprising control means disposed over the output of at least one of said plurality of lens members, said control means being effective for controlling said lens member output to at least one of a plurality of output conditions.

7. The centralized lighting system as set forth in claim 6 wherein said control means includes a control arm moveable to a position over said lens member output so as to block light output therefrom.

8. The centralized lighting system as set forth in claim 6 wherein said control means includes a color filter member effective so as to change said lens member output to a different color.

9. The centralized lighting system as set forth in claim 1 further comprising at least one headlamp reflector assembly in which output ends of at least two of said plurality of optical fibers terminate so as to deliver light output thereto.

10. The centralized lighting system as set forth in claim 9 wherein said headlamp reflector assembly includes a V-shaped mirror member receptive of light output from said output ends of said at least two optical fibers, said V-shaped mirror being effective so as to direct such light output to a curved reflector member which serves to spread such light output into a desired beam pattern for delivery through a lens member.

11. A centralized lighting system having multiple outputs for distributing light output to a plurality of remote locations, said lighting system comprising:

a high brightness light source;

a reflector member configured in the form of a parabaloid and having associated therewith, an optical focal point, said light source being disposed at said optical focal point so that light is directed from said reflector member in an essentially parallel manner;

a plurality of lens members disposed in a common plane and in a spaced apart relation to said reflector member and receptive of such light directed from said reflector member, said plurality of lens members being effective so as to focus said light from said light source and said reflector member into a plurality of spatially separated light output spots;

a plurality of optical fibers each one receptive of one of said spatially separated light output spots and effective so as to deliver light to said remote locations; and wherein said plurality of optical fibers are disposed in a non-contacting relation to one another.

12. The centralized lighting system as set forth in claim 11 wherein said plurality of lens members are disposed relative to one another so that at least a portion of each lens member contacts at least another portion of at least one other lens member.

13. The centralized lighting system as set forth in claim 12 wherein said portions of said lens members that contact one another are tapered so as to securely fit adjacent one another thereby substantially eliminating spaces formed therebetween.

14. The centralized lighting system as set forth in claim 11 further comprising control means disposed over the output of at least one of said plurality of lens members, said control means being effective for controlling said lens member output to at least one of a plurality of output conditions.

15. The centralized lighting system as set forth in claim 14 wherein said control means includes a control arm moveable to a position over said lens member output so as to block light output therefrom.

16. The centralized lighting system as set forth in claim 14 wherein said control means includes a color filter member effective so as to change said lens member output to a different color.

17. The centralized lighting system as set forth in claim 11 further comprising at least one headlamp reflector assembly in which output ends of at least two of said plurality of optical fibers terminate so as to deliver light output thereto.

* * * * *